UNITED STATES PATENT OFFICE.

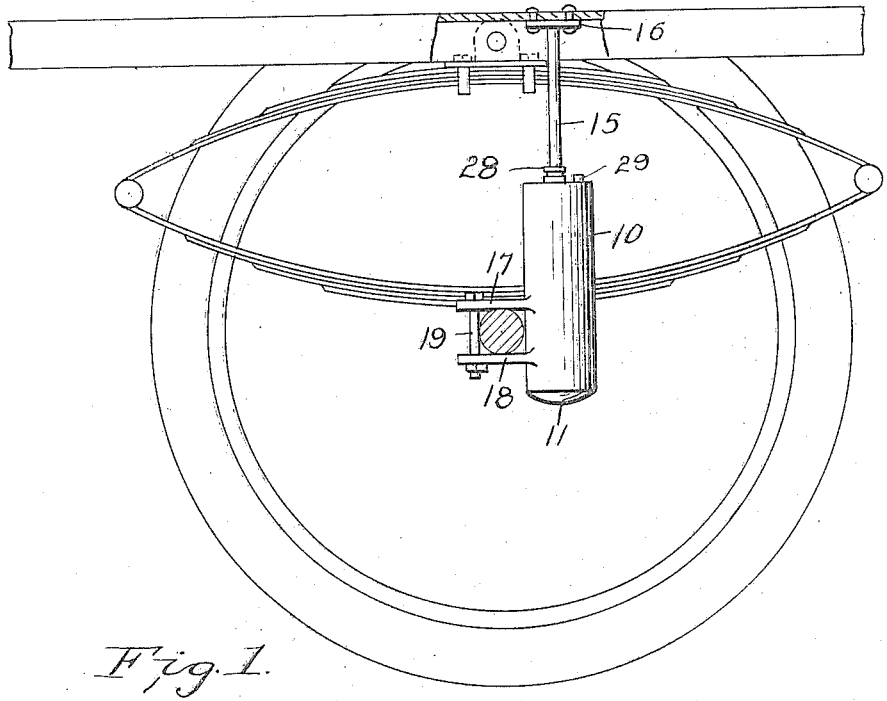
Fig. 1.
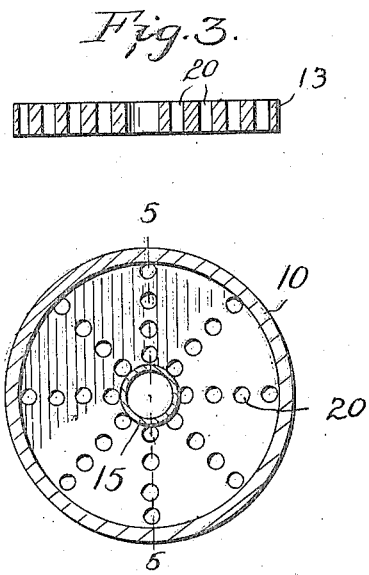
Fig. 2.
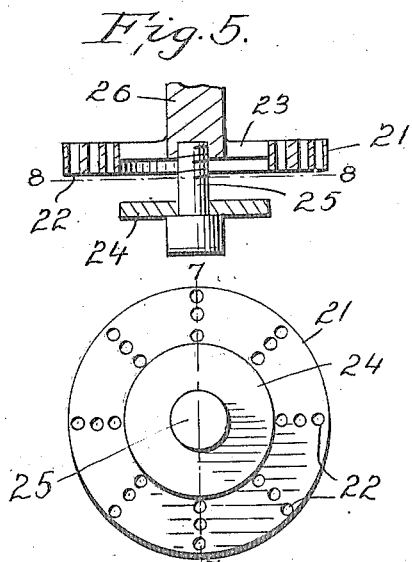
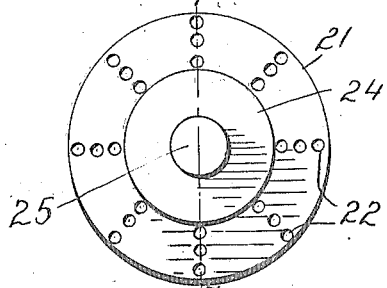

JOHN W. HOLT, OF ST. JOSEPH, MISSOURI.

AUTOMATIC SHOCK-ABSORBER.

1,123,744.

Specification of Letters Patent.

Patented Jan. 5, 1915.

Application filed July 7, 1913. Serial No. 777,726.

*To all whom it may concern:*

Be it known that I, JOHN W. HOLT, a citizen of the United States, residing at St. Joseph, in the county of Buchanan and State of Missouri, have invented certain new and useful Improvements in Automatic Shock-Absorbers; and I do hereby declare the following to be a full, clear, and exact description of the invention, such as will enable others skilled in the art to which it appertains to make and use the same.

This invention relates to new and useful improvements in shock absorbers, and has particular reference to such devices designed particularly for automobiles.

The principal object of this invention contemplates the provision of a dashpot shock absorber, which will permit the springs to expand without appreciable resistance from the shock absorber when an obstacle is encountered by the machine, but which will operate to prevent sudden compression or flattening of the springs.

A further object is to provide a modified form of dashpot, in which the piston head is so seated that both compression and expansion of the springs will be resisted.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a side elevation illustrating the single cylinder adapted for use on this invention in assembled relation. Fig. 2 is a horizontal detail sectional view taken through the casing, Fig. 3 is a transverse sectional view of the piston head, Fig. 4 is a bottom plan view of a modified form of piston head, and Fig. 5 is a transverse sectional view taken on line 7—7 of Fig. 4.

Proceeding now to the description of the drawings and with particular reference to Fig. 2, the numeral 10 designates a cylindrical metallic casing, the lower end of which is provided with an integral closure plate 11, and the upper end of which is suitably closed. The member 10 is in practice partly filled with oil to resist the piston head 13, which is detachably secured by a nut on the lower screw threaded terminal of a piston rod 15, the upper terminal of which is provided with an apertured plate 16, designed to be bolted or otherwise secured to the upper portion of a spring chassis or frame of the automobile. The member 10 which is essentially a dashpot, is secured to the axle of the automobile by a pair of spaced laterally extending bracket arms 17 and 18 which are arranged above and below the axle and are clamped thereon by a bolt 19. The piston head 13, illustrated in detail in Figs. 2 and 3, consists essentially in a cylindrical plate provided with a plurality of orifices 20 through which the oil passes when the piston rod 15 moves up or down with the compression or expansion of the springs of the automobile.

The modified form of piston head is illustrated particularly in Figs. 4 and 5. This modified form includes a circular plate 21 formed with several annular series of apertures or orifices as at 22. The central portion of the member 21 is formed with segmental openings as at 23. When the piston head moves downwardly, these openings 23 are closed by a circular valve plate 24 apertured and loosely mounted for sliding movement on a headed stub pin 25 screw threaded into the lower terminal of the piston rod 26. When the springs expand and the member 21 again moves to the upper end of the dashpot, the plate 24 is forced away from the openings 23, as indicated in Fig. 5, and the oil passes through the openings 23, thus preventing, in as large a measure as possible, the retarding of the expansion of the springs.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus described my invention, what I claim is:

The combination with an automobile of a cylindrical dash pot adapted to receive a quantity of oil, means for securing said dash pot to the axle of the automobile, a piston head slidably mounted in said dash pot and provided with central segmental openings and series of circular openings adjacent its periphery, a headed pin detachably secured to the under face of said piston head, a disk valve slidable upon said pin and adapted to close the segmental openings in said piston head upon the downward movement of said piston and to move in open position in the upward movement of said piston and a piston rod operatively connecting said piston head to the chassis of an automobile.

In testimony whereof I affix my signature in presence of two witnesses.

JOHN W. HOLT.

Witnesses:
I. H. BARR,
L. C. ALLEN.